US Patent Number: 4,821,888
Hankes
Date of Patent: Apr. 18, 1989

[54] CAROUSEL MATERIAL HANDLING APPARATUS

[76] Inventor: William P. Hankes, 4363 Wilshire Blvd. #301A, Mound, Minn. 55364

[21] Appl. No.: 114,576

[22] Filed: Oct. 29, 1987

[51] Int. Cl.$^4$ ............................................. A47F 3/08
[52] U.S. Cl. ...................................... 211/1.5; 211/122
[58] Field of Search ........................ 211/122, 1.5, 121; 312/134, 268; 40/106.31; 310/162

[56] References Cited

U.S. PATENT DOCUMENTS

| | | |
|---|---|---|
| 571,347 | 11/1896 | Dodge . |
| 1,347,936 | 7/1920 | Carroll ............................ 211/122 X |
| 3,575,298 | 4/1971 | Ruoss .................................... 211/1.5 |
| 3,780,852 | 12/1973 | Weiss et al. . |
| 3,829,189 | 8/1974 | Staller . |
| 4,015,537 | 4/1977 | Graef . |
| 4,441,617 | 4/1984 | Forsberg ............................ 211/1.5 |
| 4,557,534 | 12/1985 | Dahnert . |
| 4,561,820 | 12/1985 | Matheny . |

FOREIGN PATENT DOCUMENTS 532229  10/1956  Canada ................................ 211/122

OTHER PUBLICATIONS

"Richards-Wilcox Storage and Retrieval Carousels", Catalog No. A-570-R2 of White Consolidated Industries, Inc., copyright 1985.
"Carousel Drive System", Baymond Corporation, copyright 1985.

Primary Examiner—Reinaldo P. Machado
Assistant Examiner—Sarah A. Lechok Eley
Attorney, Agent, or Firm—Merchant, Gould, Smith, Edell, Welter & Schmidt

[57] ABSTRACT

The material handling apparatus is disclosed comprising a plurality of storage bins and a continuous pathway. The pathway includes spaced apart linear pathway segments joined by arcuate end segments. The bins are supported on the pathway to move about the pathway in a predetermined desired direction. Each of the bins is hingedly connected to one another to define a continuous chain of hingedly connected bins. A drive mechanism is provided to independently drive each of the bins with the drive means operable only when the hinge connector members of the bins are disposed in a linear pathway segment.

7 Claims, 3 Drawing Sheets

CAROUSEL MATERIAL HANDLING APPARATUS

BACKGROUND OF THE INVENTION

I. Field of the Invention

This invention pertains to a carousel material handling apparatus and more particularly to such an apparatus particularly suitable for handling heavy loads.

II. Description of the Prior Art

Carousel material handling systems are well known. Such systems include a plurality of bins which are mounted to travel in a generally oval path. The bins are disposed in an upright position and hold material to be stored for later retrieval. Examples of such systems are shown in U.S. Pat. No. 3,780,852 to Weiss, et al. as well as Catalog No. A-570-R2 of White Consolidated Industries, Inc. (Copyright 1985) and a brochure of Raymond Corporation entitled "Carousel Drive System" and bearing copyright date 1985. As shown in all of these systems, a plurality of bins are supported for movement around a continuous pathway. The pathway includes both spaced-apart linear segments joined by arcuate end segments.

As the capacity of a material handling system increases (i.e. the weight of the material to be handled by the system increases), the prior art systems have demonstrated an inability to handle significantly increased loads. I have determined that a novel drive and pathway arrangement can surprisingly improve the capacity of a carousel material handling system.

SUMMARY OF THE INVENTION

According to a preferred embodiment of the present invention, a carousel material handling apparatus is described and includes a plurality of storage bins. The bins are disposed on a continuous pathway. The pathway includes first and second spaced apart pathway segments. The first arcuate pathway segment joins first ends of the linear pathway segments and the second arcuate pathway segment joins the second ends of the linear pathway segments. The linear arcuate pathway segments cooperate to define a continuous pathway. The bins are supported for each of the bins to move about the pathway. Hinged connector elements are disposed for hingedly connecting contiguous bins to define a continuous chain of hingedly connected bins disposed on the pathway. Drive means are associated with a plurality of the bins to independently urge each one of the plurality to move in a predetermined common direction along the continuous pathway. A drive engagement apparatus is disclosed for operating the drive means of any one of the plurality of bins only when the connecting members of the bin are disposed on a linear pathway segment.

DETAILED DESCRIPTION OF THE PREFERRED EMBODIMENT

Figure 3:
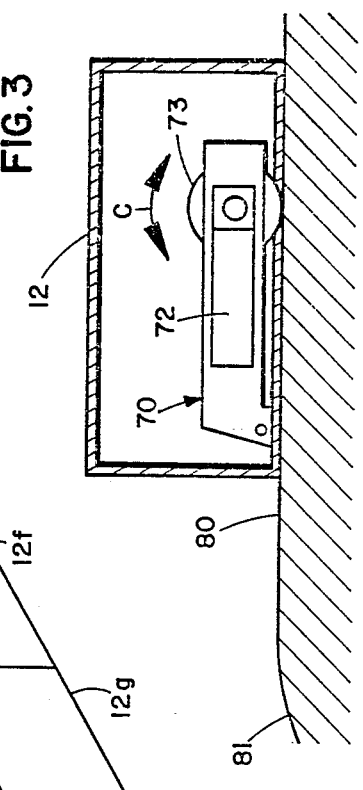
FIG. 3 is a view taken in elevation of a section of a bin of the material handling apparatus of the present invention schematically showing drive means.

Referring now to the several figures in which identical elements are numbered identically throughout, the present invention will now be described with reference to a preferred embodiment. In each of FIGS. 1 through 4, the material handling apparatus of the present invention and its associated elements are schematically shown. The apparatus 10 includes a plurality of storage bins 12 through 12$i$. Each of bins 12 has a vertical axis disposed in the direction of arrow A (shown in FIG. 1). The bins may be stacked shelves or crates or any other storage arrangement for holding and carrying material. Examples of such bins are shown in the aforementioned U.S. Pat. No. 3,780,852 and the aforementioned Catalog No. A-570-R2 of White Consolidated Industries.

The bins 12 through 12$i$ are disposed on a pathway 14. As shown most clearly in FIG. 2, pathway 14 includes a first linear pathway segment 16 and a second linear pathway segment 18. Segments 16 and 18 are parallel aligned and spaced apart and extend from first ends 16$a$ and 18$a$ to second ends 16$b$ and 18$b$ (shown best in FIGS. 2 and 4). The pathway 14 also includes a first arcuate pathway segment 20 and a second arcuate pathway segment 22. First arcuate pathway segment 20 joins first end 16$a$ and 18$a$ and second arcuate pathway segment 22 joins second ends 16$b$ and 18$b$. Accordingly, linear segments 16 and 18 and arcuate segments 20 and 22 cooperate to define a continuous pathway 14.

Figure 1:
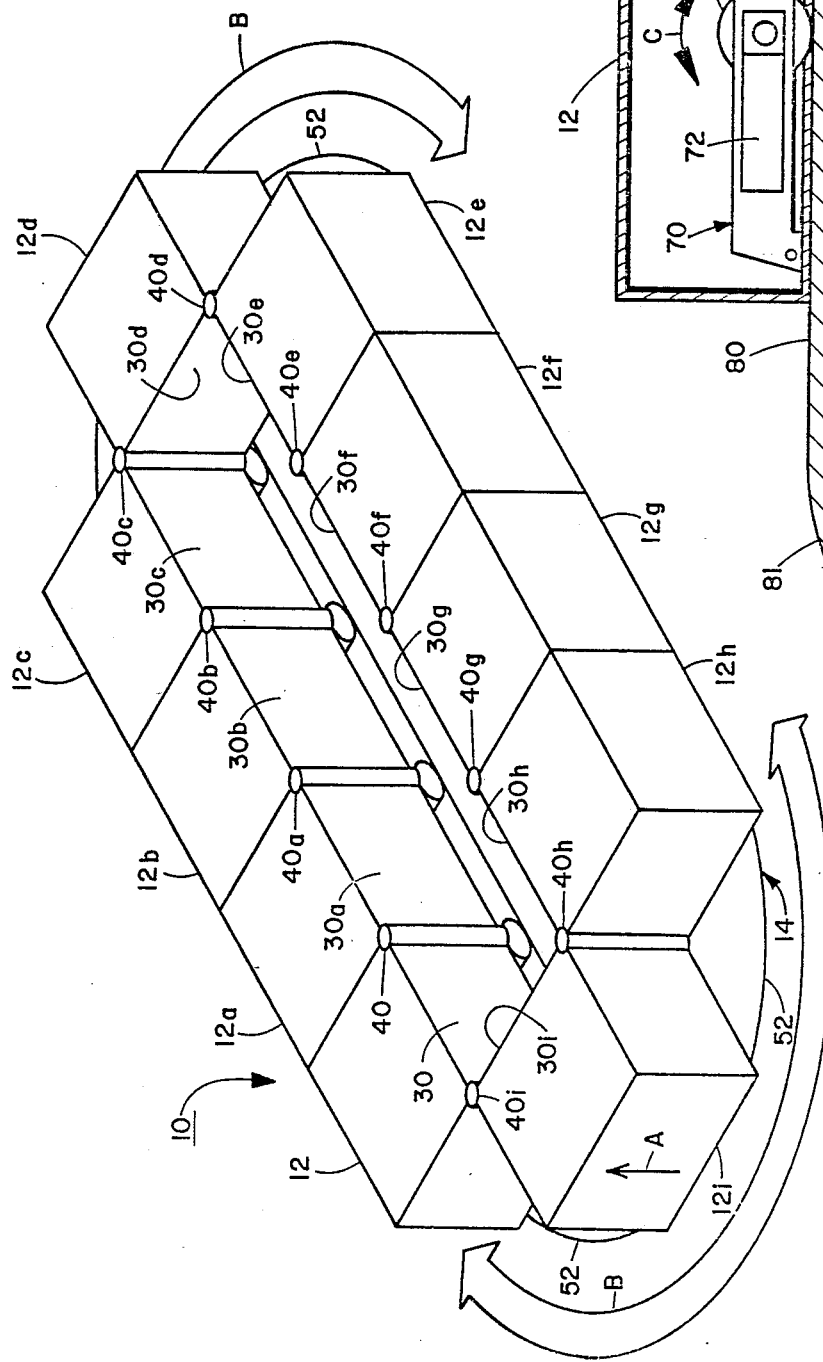
FIG. 1 is a perspective view of a schematic representation of a material handling apparatus according to the present.

The bins 12–12$i$ are disposed on the pathway 14 to move about pathway 14 in a both clockwise and counterclockwise directions as shown in FIG. 1 by Arrows B. Means for mounting a plurality of bins on a pathway such as pathway 14 are well known in the art (examples of which are shown in the aforementioned patent application and catalogs). In a preferred embodiment of the present invention, each of the bins 12–12$i$ will include inner opposing faces 30–30$i$. Abutting faces 30–30$i$ of contiguous bins 12–12$i$ are hingedly connected at hinge points 40–40$i$.

Figure 4:
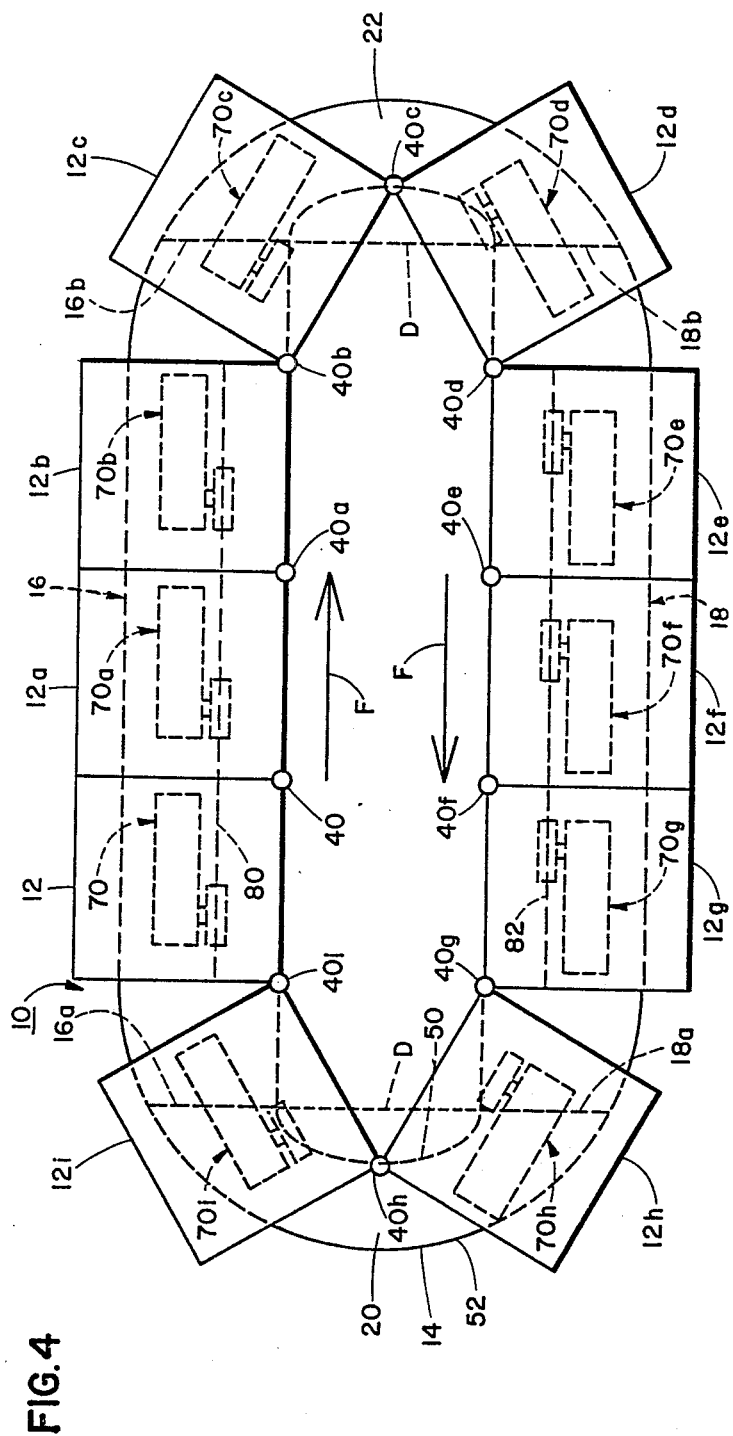
FIG. 4 is a view similar to FIG. 2 showing bins partly moved about the pathway.

The hinge connections are shown schematically in FIG. 4 and include a plurality of hinge pins such as pins 41 and 41$a$ disposed on opposite ends of bins 12. Pins 41 and 41$a$ rotate freely with respect to the bins 12 about a vertical axis.

Disposed beneath each of pins 41 and 41$a$ is a caster housings 42, 42$a$ which houses a caster wheel 44, 44$a$. Likewise, each of caster housings 42 and 42$a$ includes a mounting plate 43, 43$a$ on which is disposed a plurality of rollers 45, 45$a$, 46, 46$a$. Wheels 44 and 44$a$ are disposed to rotate about a generally horizontal axis while wheels 45, 45$a$, 46, 46 are disposed to rotate about a vertical axis.

Figure 5:
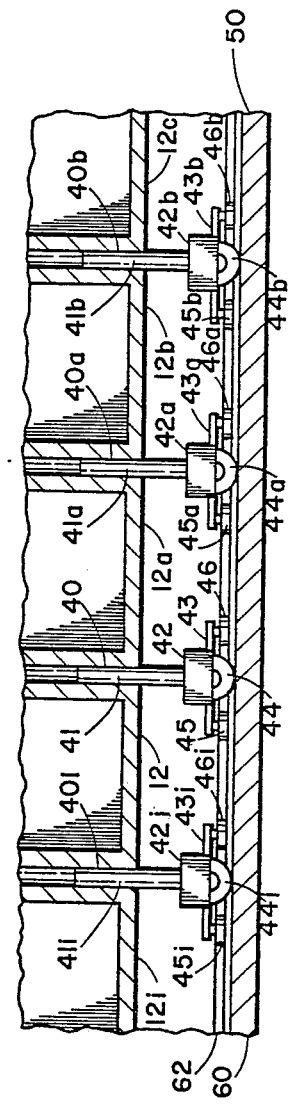
FIG. 5 is a view taken in elevation schematically showing hinge connection members and support casters of the present invention.

Pathway 14 is defined by an inner track system 50 and an outer track system 52. Inner track 50 comprises a pair of rails 60 and 62 (shown in FIG. 5) with rail 60 disposed to engage wheels 44, 44$a$ and rail 62 disposed to abut wheels 45, 45$a$ and 46, 46$a$. Accordingly, rail 60 carries the load of the bins and rail 62 takes up thrust of the bins to maintain movement of the bins along the generally oval pathway. It will be appreciated that casters, hinge connections and rail constructions are well within the skill of the art and are schematically shown for illustration purposes only.

Each of bins 12-12i includes a motor and drive wheel system 70-70i. Shown best in FIG. 3 which is a schematic representation of bin 12, motor system 70 includes a motor 72 and a drive wheel 73. Drive wheel 73 is mounted for rotation about a generally horizontal axis and is driven by motor 72 to rotate about that axis in either direction as indicated by arrow C.

A pair of drive rails 80 and 82 are associated with first linear segment 16 and second linear pathway segment 18, respectively. Drive rails 80 and 82 are disposed to engage the drive wheel 73-73i of a bin 12-12i situated over drive rails 80 and 82. Drive rails 80 and 82 are positioned and provided with a length such that wheels 73-73i only engage the rails 80, 82 when both hinge pins 40-40i of any bin 12-12i are on a linear path segment. When a bin's hinge pins are disposed off of a linear path segment and on one of the arcuate path segments, the wheels 73 are spaced from the rails 80 and 82. With the wheel 73 thereby spaced, the wheels do not act to drive the particular bin. As shown in FIG. 3, the rails, such as rail 80, includes arcuate downwardly bent ends 81 against which a drive wheel such as wheel 73 engages or disengages as the drive system 70 encounters the rail 80.

In a preferred embodiment, the inner track 50 of pathway 14 on arcuate segments 20 and 22 is a half segment of an ellipse with a line joining the ends 16a, 18a and 16b, 18b constituting the major axis D of the ellipse. The length of D is the same distance as the distance between hinge pins (such as pins 40 and 40i) of a given bin (such as bin 12). Drive rails 80 and 82 and wheels 73-73i are disposed above the pathway 14 to avoid interference of wheels 73-73i with the elliptical inner track 52 as a bin (such as bin 12i in FIG. 2) passes the arcuate segments.

The outer track 52 of pathway 14 is a line defined by movement of a fixed point (such as point D) along a besecting line (such as line E) of a bin. At that point, the bins 12-12a are preferably provided with a caster such as those shown in FIG. 4 which can engage the rails of track 52.

Figure 2:
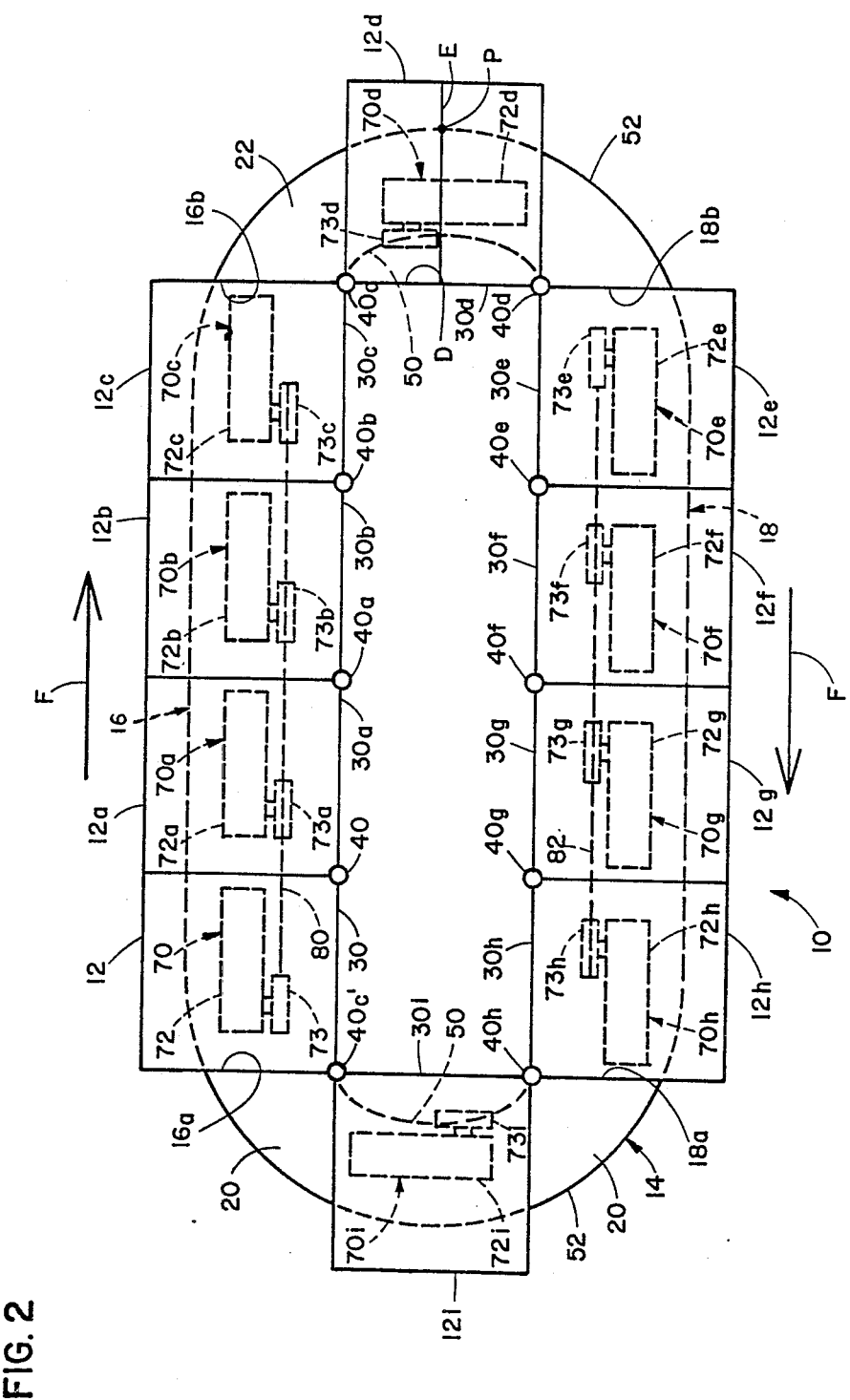
FIG. 2 is a top plan view of a schematic representation of the material handling system of the present invention.

As shown in FIGS. 2 and 4, the outer track 52 is generally straight on linear pathways 16 and 18 except for the extreme ends of the pathways 16, 18. At the ends, the track 52 curves to reflect the natural path a point, such as point P in FIG. 2, would follow if a bin moves around the pathway 14 with its casters 44-44i following inner track 50 through the half ellipses at arcuate segments 20, 22.

From the foregoing description, it can be seen that the plurality of hingedly connected bins define a continuous chain disposed on the pathway. The pitch of the chain is the distance between contiguous hinge connections 40-40i. Those bins whose hinge pins are located on the linear pathways (such as bins 12-12c and 12-12h in FIG. 2 and 12-12b and 12e-12g in FIG. 4) are being driven in a common direction (such as the direction of arrow F). (Alternatively, all bins could be driven in the opposite direction. It will be appreciated, of course, all bins must be driven in a common direction).

The novel arrangement of the present invention provides for numerous advantages. Since each bin has its independent motor system, each bin can carry a substantially increased load. Also, the motor system of each of the bins cooperates with one another to drive the entire bin chain. For example, those bins whose motor systems are engaging rail 80 are pulling the entire chain while those bins whose motor system are engaging rail 82 are pushing the chain. The bins which are not located on linear path segments are not actively pushing or pulling to thereby avoid binding of the chain as it travels around the arcuate end segments.

From the foregoing detailed description of the present invention has been shown how the invention has been attained in a preferred manner. However, modifications and equivalents of the disclosed concepts, such as readily occur to those skilled in the art are intended to be included in the scope of this invention. Thus, the scope of the invention is intended to be limited only by the scope of the claims as are, or may hereafter be, appended hereto.

I claim:

1. A carousel material handling apparatus comprising:
    a plurality of storage bins;
    a first and second generally linear spaced apart pathway segment each extending between first and second ends, first and second arcuate pathway segments, said first arcuate pathway segment joining first ends of said linear pathway segments and said second arcuate pathway segment joining second ends of said linear pathway segments, said first and second linear pathway segments and said first and second arcuate pathway segments cooperating to define a continuous pathway;
    bin support means for supporting each of said bins to move about said continuous pathway with said bins disposed in side-by-side relation to define contiguous bins;
    connecting means for hingedly connecting contiguous bins to define a continuous chain of hingedly connected bins disposed on said pathway;
    drive means associated with a plurality of said bins to independently urge each one of said plurality of bins to move in a predetermined common direction around said continuous pathway; and
    drive engagement means for operating said drive means of any one of said plurality of bins to urge said any one of said plurality of bins to move in said predetermined common direction when said any one of said plurality of bins is disposed on one of said linear pathway segments and said drive engagement means further selected for said drive means not to be urging said any one of said plurality of bins to move in said predetermined common direction when said any one of plurality of bins is disposed on one of said arcuate pathway segments.

2. A carousel material handling apparatus according to claim 1 wherein said drive engagement means is selected to operate said drive means of said any one of said plurality of bins when said connecting means of said any one of said plurality of bins is disposed on one of said linear pathway segments.

3. An apparatus according to claim 1 wherein said drive means comprises a motor associated with each one of said plurality of said bins; said drive engagement means comprising a wheel and cooperating rail, said wheel driven by said motor, said rail disposed adjacent a linear pathway segment and dimensioned for a wheel of a bin to engage said rail when connecting means of said bin are disposed on said linear pathway segment.

4. An apparatus according to claim 1 wherein said arcuate segment includes an inner track, said inner track comprising a segment of an ellipse.

5. A carousel material handling apparatus comprising:

a plurality of storage bins;

first and second generally linear spaced apart pathway segments each extending between first and second ends, first and second arcuate pathway segments, said first arcuate pathway segment joining first ends of said linear pathway segments and said second arcuate pathway segment joining second ends of said linear pathway segments, said first and second linear pathway segments and said first and second arcuate pathway segments cooperating to define a continuous pathway;

bin support means for supporting each of said bins to move about said continuous pathway with said bins disposed in side-by-side relation to define contiguous bins;

connecting means for hingedly connecting contiguous bins to define a continuous chain of hingedly connected bins disposed on said pathway; and drive motors disposed associated with each of said bins with means for each of said motors to be independently operated to urge any one of said bins to move in a predetermined desired direction when said any one of said bins is disposed on a linear pathway segment and said means further selected for each of said motors not to urge said any one of said bins in said predetermined desired direction when said any one of said bins is disposed on an arcuate pathway segment.

6. An apparatus according to claim 2 wherein said connecting means comprises a plurality of hinge points connecting contiguous bins with a distance between hinge points being equal for all bins.

7. A carousel material handling apparatus according to claim 5 wherein said means for each of said motors to be independently operated is selected to urge said any one of said bins to move in said predetermined desired direction when connecting means of said bin is disposed on a linear pathway segment.

* * * * *